United States Patent
Ferris et al.

(10) Patent No.: US 8,011,667 B2
(45) Date of Patent: Sep. 6, 2011

(54) UPSET RESISTANT MECHANICAL SEAL

(75) Inventors: Jason C. Ferris, Kalamazoo, MI (US); Larry E. Jacobs, Kalamazoo, MI (US); Steven D. DeSmit, Kalamazoo, MI (US); Daryl L. Griffith, Three Rivers, MI (US); Anne L. Saad, Kalamazoo, MI (US); R. James Seaman, Jr., Kalamazoo, MI (US)

(73) Assignee: Flowserve Management Company, Irving, TX (US)

( * ) Notice: Subject to any disclaimer, the term of this patent is extended or adjusted under 35 U.S.C. 154(b) by 504 days.

(21) Appl. No.: 12/290,268

(22) Filed: Oct. 29, 2008

(65) Prior Publication Data

US 2009/0127793 A1     May 21, 2009

Related U.S. Application Data

(60) Provisional application No. 61/003,831, filed on Nov. 20, 2007.

(51) Int. Cl.
*F16J 15/34* (2006.01)
(52) U.S. Cl. .................................. 277/371; 277/408
(58) Field of Classification Search .......... 277/359–361, 277/369–372, 390, 404, 408
See application file for complete search history.

(56) References Cited

U.S. PATENT DOCUMENTS

| | | | |
|---|---|---|---|
| 4,792,146 A | 12/1988 | Lebeck et al. | |
| 5,238,253 A * | 8/1993 | Sieghartner | 277/408 |
| 5,294,132 A | 3/1994 | Duffee et al. | |
| 5,544,896 A | 8/1996 | Draskovich et al. | |
| 5,716,054 A | 2/1998 | Duffee et al. | |
| 5,961,122 A | 10/1999 | Marsi | |
| 6,655,694 B1 | 12/2003 | Nakano | |
| 6,655,695 B1 * | 12/2003 | Sund et al. | 277/404 |
| 2004/0026871 A1 * | 2/2004 | Stephens et al. | 277/401 |

OTHER PUBLICATIONS

International Search Report and Written Opinion dated Mar. 18, 2009.

\* cited by examiner

*Primary Examiner* — Vishal Patel
(74) *Attorney, Agent, or Firm* — Miller Canfield Paddock and Stone; Mark L. Maki

(57) ABSTRACT

A mechanical seal face has a significant increase in the ability of the seal to tolerate poor lubrication conditions such as dry running. The mechanical seal employs a thin, non-corrugated flat sheet of flexible thermally conductive graphite material placed between one of the mechanical seal faces and a metal surface such as a metal surface defined by a shaft sleeve or gland serving as a seal ring holder. The graphite sheet is located axially between a back face of the more thermally conductive mechanical seal ring and the metal face holder part. The conductive seal face material preferably is a ceramic or cermet material such as silicon carbide, tungsten carbide, silicon nitride, aluminum oxide, or a metallic material such as stainless steel. Fluid pressure and spring forces are used to create a compressive load between the seal face, graphite sheet, and metal part to maximize continuous contact between the opposed faces of these parts and the opposite sides of the graphite sheet, and heat buildup at contacting seal faces flows away therefrom to the metal part through the thermally conductive sheet.

18 Claims, 5 Drawing Sheets

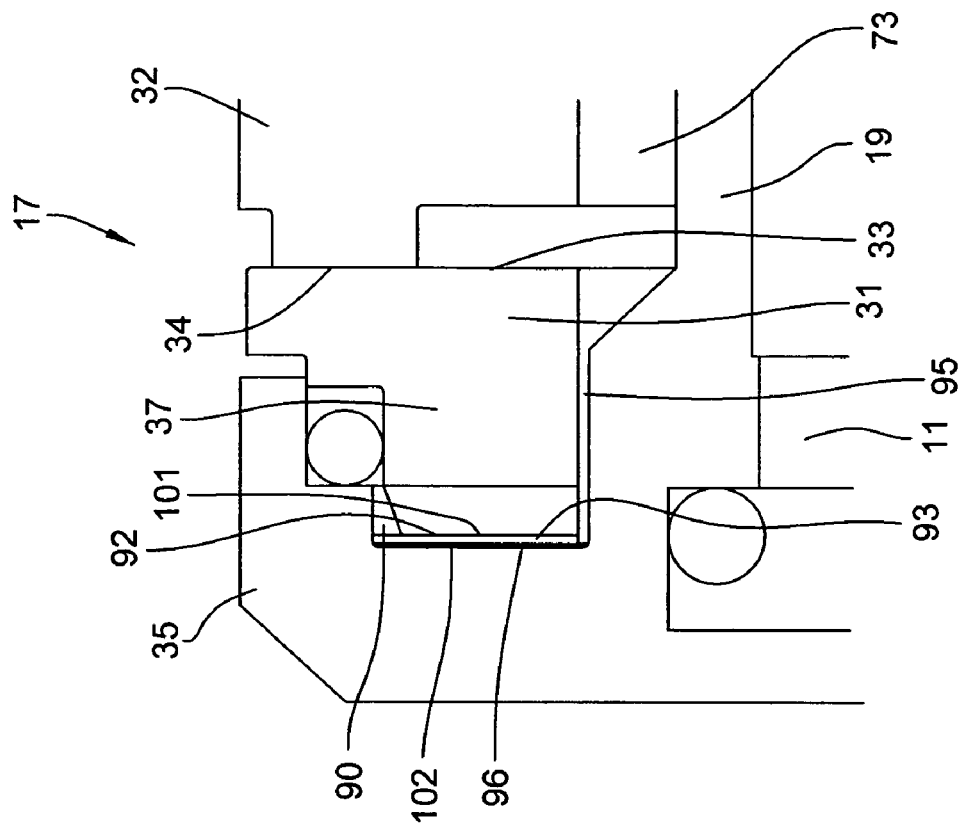
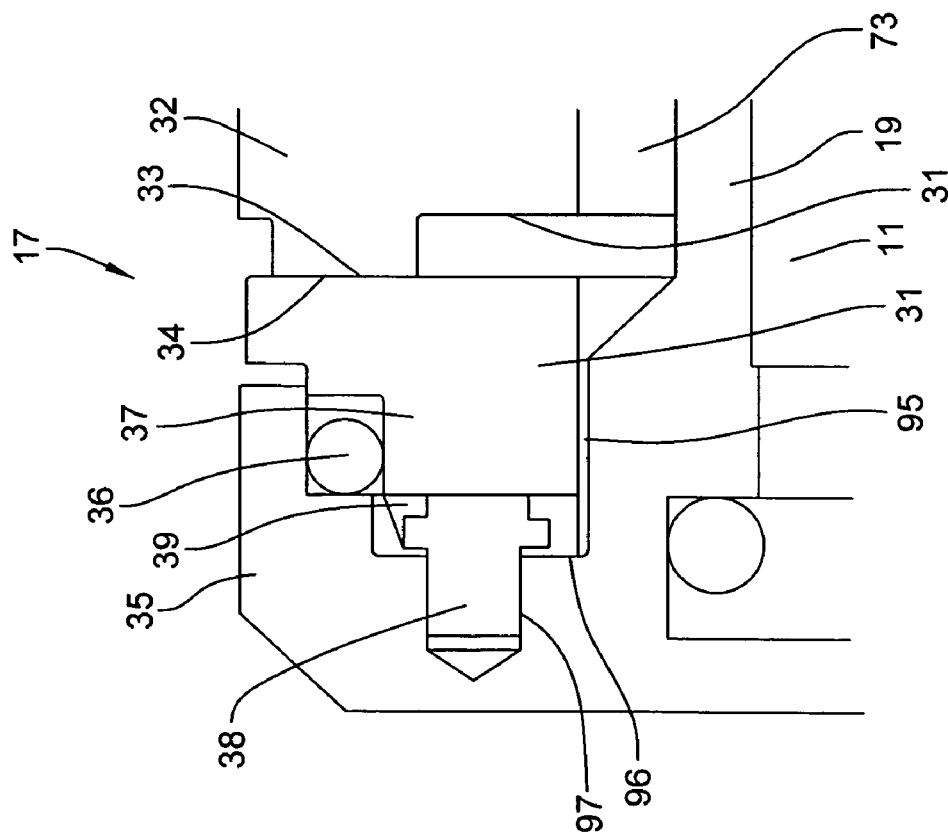

UPSET RESISTANT MECHANICAL SEAL

CROSS-REFERENCE TO RELATED APPLICATION

This application claims the benefit of U.S. Provisional Application Ser. No. 61/003,831, filed Nov. 20, 2007, which is incorporated herein by reference in its entirety.

FIELD OF THE INVENTION

The invention relates to a mechanical seal arrangement which is configured so as to dissipate excessive heat from mechanical seal faces resulting from upset conditions such as poor lubrication conditions which might occur during dry running of the mechanical seal.

BACKGROUND OF THE INVENTION

Mechanical seals generate significant heat loads at an interface between a flat rotating seal face and an opposing flat stationary seal face. These heat loads are due to contact friction between the faces and viscous shear of the lubricating fluid between the faces. Removal of this heat is typically through convection with the gas or liquid fluids at the surfaces of the rotating and stationary seal faces, and conduction at locations where the face comes into contact with metal parts.

The temperature at the seal faces varies directly with the heat generation, and varies inversely with the convection and conduction coefficients. In fluids that act as poor lubricants and as poor convective media such as air or other gases, conduction of heat into the metal components of the seal and the sealed equipment becomes critical in determining the seal face temperature.

In typical mechanical seals, the conduction coefficient is poor between a seal face and a metal part due to the rigid nature of both the mechanical seal face and the metal part, resulting in air gaps between the parts. In dry running conditions, the continuing contact between the seal faces can lead to excessively high seal face temperatures wherein the excessive temperature can rapidly lead to seal failure such as by damaging the carbon seal rings and damaging O-rings, particularly those in contact with the other ring which may be made of silicon carbide.

With respect to such problems, particularly under dry running conditions, some mechanical seals may effect heat removal from faces, wherein, for example, the surface area of the seal faces in contact with the process fluid can increase convection of heat. This works well under normal operating conditions where convection is the primary mode of heat removal, however this does not solve the problem of high seal face temperatures associated with dry running conditions. Further, a seal face surface in direct contact with a metal surface tends to conduct heat from the seal ring to the metal surface. This improves conductivity, but only to the extent that the flatness of the metal and seal face surface at the contact interface is controlled. Lapping can improve the surface contact at the interface although this has the trade-off of significant additional expense.

It therefore is an object of the invention to overcome difficulties with dissipating heat resulting from dry running and other upset conditions.

In view of the foregoing, the invention relates to a method for enhancing heat removal from mechanical seal faces which results in a significant increase in the ability of the seal to tolerate poor lubrication conditions such as dry running where heat loads are increased and convection cooling is poor.

The mechanical seal of the invention employs the following features: (1) A thin, flat sheet of flexible thermally conductive graphite material placed between one of the mechanical seal faces and a metal surface such as a metal surface defined by a shaft sleeve or gland serving as a seal ring holder. (2) The graphite sheet is located axially between the more thermally conductive mechanical seal face and the metal face holder part. The conductive seal face material preferably is a ceramic or cermet material such as silicon carbide, tungsten carbide, silicon nitride, aluminum oxide, or a metallic material such as stainless steel. (3) Fluid pressure and spring forces are used to create a compressive load between the seal face, graphite sheet, and metal part to maximize continuous contact between the opposed faces of these parts and the opposite sides of the graphite sheet. (4) The graphite sheet preferably has a thickness of 0.005" to 0.030".

More particularly, the invention incorporates a thin sheet of graphite sheet material that is sandwiched between a silicon carbide, tungsten carbide, silicon nitride, or aluminum oxide seal face material and a metal component of the seal such as the sleeve or gland. The sheet is housed or sandwiched axially between the surface of the seal face, which is located opposite of the primary sealing interface defined between opposed seal faces, and the surface of either a rotating or stationary metal component such as a sleeve, gland, or rotating face support.

The sheet material is used to enhance the conduction of heat from the seal face into the metal component, thereby reducing the seal face temperature and improving seal performance, especially in poor lubrication conditions such as dry running.

In dry run tests conducted on a prototype mechanical seal design using a conventional direct metal conduction path from the mechanical seal face to a metal seal ring holder, the seal face temperature would reach excessive temperatures in under 10 minutes of dry running that were sufficiently elevated to damage the seals and cause seal failure. This temperature would degrade the seal face materials and elastomers in contact with the seal faces, rapidly resulting in seal failure. When the inventive seal was tested with the graphite sheet between the seal face and the metal sleeve, seal face temperatures were substantially less and did not reach the level which would cause seal failure. The seals ability to operate without seal failure is extended several times longer and in some cases, may be able to avoid seal failure from elevated temperatures for as long as one hour of dry running.

The graphite sheet material comprises a commercially available industrial grade flexible graphite flat sheet material, and has been shown to be effective in thicknesses from 0.005" to 0.030" in testing. Significant features of the sheet that enable conduction are: (1) the ability of the material to conform to the surface variations of both the seal face and metal part, increasing the contact between the parts and therefore the conductivity; (2) high thermal conductivity in the transverse plane of the sheet, which enables improved conduction in any areas where the sheet does not fully conform; and (3) high thermal conductivity in the axial plane of the sheet, which enables heat flow.

The general use of a gasket between a seal face and a metal component is provided in some seals. However, in these applications, the gasket material is not thermally conductive and only serves as a means to prevent damage or distortion to the seal faces.

Further, some commercially available seals use a corrugated graphite gasket between a carbon graphite seal face and a metal component. In this type of application, the use of such a gasket is as a compliant seat and drive mechanism for the face. In this instance, the gasket is a thermally conductive graphite material, but the carbon graphite seal face material is not thermally conductive and thus does not provide the operational benefit of heat removal from the interface defined between two opposed seal faces. Hence, the carbon graphite seal impedes transfer of heat from the other seal ring.

The improved mechanical seal of the invention thereby enhances conduction of heat away from seal faces through the use of the flat graphite sheet wherein this feature can be incorporated into development of new mechanical seal products targeted toward chemical and general industrial applications worldwide. For this product alone, the performance increase caused by the sheet is significant in that it enhances the ability of the seal to survive and recover when encountering off design operation conditions that typically cause seal failure with existing seals. This improved heat transfer capability results in increased reliability and overall product life for the seals.

In addition to new products, the graphite sheet may also be incorporated into existing products and other new developments for performance enhancements of existing seal products.

Other objects and purposes of the invention, and variations thereof, will be apparent upon reading the following specification and inspecting the accompanying drawings.

BRIEF DESCRIPTION OF THE DRAWINGS

FIG. 5 is an enlarged cross-sectional view of one seal ring supported by the shaft sleeve at a drive pin location.

FIG. 6 is a cross-sectional view of the seal ring and shaft sleeve at a location circumferentially offset from the drive pin.

Figure 1:
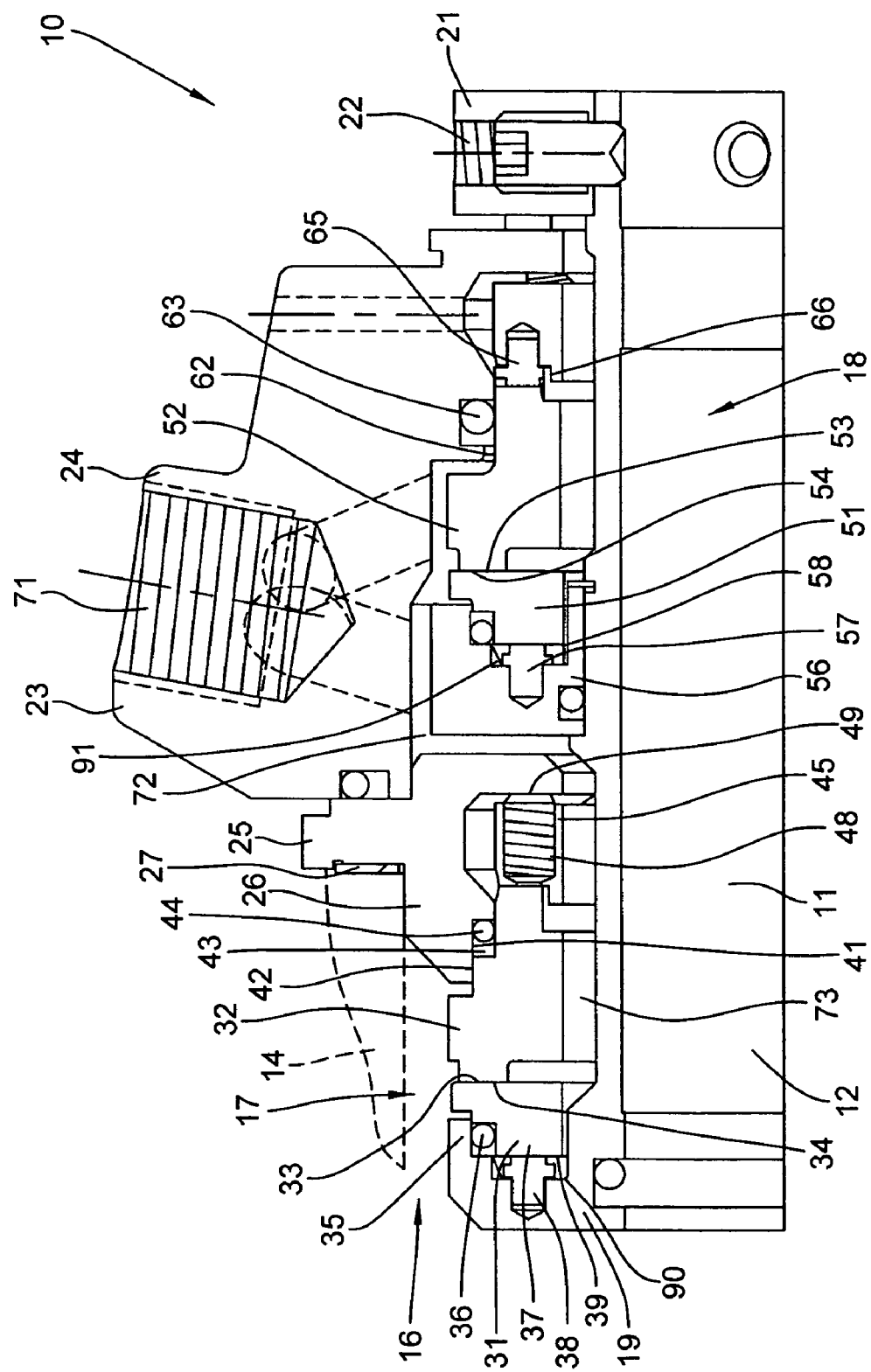
FIG. 1 is a cross-sectional view of a mechanical seal assembly.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to FIG. 1, a mechanical seal arrangement 10 according to the present invention is illustrated in a contacting, dual pusher seal configuration wherein the seal arrangement 10 is disposed in concentric relationship to an elongate shaft 11 which is rotatable about its axis 12 and driven by a motor (not illustrated) at one end and drives an equipment component such as an impeller at the opposite end. The double seal arrangement cooperates with a chamber or stuffing box 16 associated with a housing 14 of the equipment from which the shaft 11 protrudes, such as a pump targeted for use in chemical and general industrial applications.

The mechanical seal arrangement 10 includes an inner seal assembly 17 which is positioned more closely adjacent the product being handled, such as the pumping chamber, and an outer seal assembly 18 which is disposed outwardly of but axially in series with the inner seal assembly 17. These seal assemblies 17 and 18, in the illustrated embodiment, are concentrically mounted on an elongate shaft sleeve 19, which sleeve 19 concentrically surrounds and is nonrotatably fixed relative to the shaft 11. A securing ring 21 is mounted on the sleeve 19 adjacent the outer end thereof, and is provided with a plurality of set screws 22 for securement to the shaft.

The seal arrangement 10 projects partially into the chamber 16, with the outer portion of the seal arrangement 10 being disposed within and surrounded by a gland or housing part 23 which, in the illustrated embodiment, is defined by a pair of gland rings 24 and 25 which axially and sealingly abut one another. The gland rings 24 and 25 are axially secured together and fixedly and sealingly positioned relative to the housing 14. The inner gland ring 25 has an annular hub part 26 which telescopes into the outer end of chamber 16 so as to be positioned in surrounding relationship to the inner seal assembly 17. A gasket 27 cooperates between the housing 14 and gland ring 25 for creating a sealed relationship therebetween.

Referring now to the inner seal assembly 17, it includes a rotating seal ring (a rotor) 31 and a stationary seal ring (a stator) 32 which substantially concentrically surround the shaft 11 and respectively define thereon flat annular seal faces 33 and 34 maintained in abutting relative rotatable sliding contact with one another to create a seal between the regions disposed radially inwardly and outwardly thereof.

A cup-like collar 35 externally surrounds and extends axially along the shaft sleeve 19, and is adapted to receive a sealing o-ring 36. The collar 35 is sealingly engaged with a rearwardly projecting annular hub portion 37 of the rotor 31 through the intermediate elastomeric seal ring 36. One or more drive pins 38 are fixed to the collar 35 in angularly spaced relationship therearound, and project axially therefrom into recesses or notches 39 formed in the rotor 31 so as to nonrotatably connect the rotor 31 to the collar 35 wherein the rotor 31 rotates in unison with the shaft 19.

As to the stator 32, it has a stepped exterior cylindrical wall 42 which is axially slidably accommodated within a similar interior wall defined by a stepped bore 41 formed in the annular hub part 26 of the gland ring 25. These opposed stepped walls define an annular chamber 43 therebetween in which an elastomeric seal ring 44 is accommodated to create a sealed relationship between the stator 32 and the gland ring 25.

The annular hub part 26 has a spring holder 45 which has one or more pins fixed thereto at angularly spaced intervals like pins 38, which pins conventionally project axially into recesses which open axially inwardly of the stator 32 like recesses 39 so as to nonrotatably couple the stator 32 to the gland ring 25. Further recesses 48 are formed axially in the spring holder 45 in circumferentially spaced relationship, and these recesses 48 accommodate therein springs 49 which react between the spring holder 45 and the gland ring 25 so as to always resiliently bias the stator 32 axially toward the rotor 31 to maintain contact between the seal faces 33 and 34, and in turn axially bias the rotor 31 into collar 35. While the springs 49 are used in the illustrated seal construction, it also is known to use a bellows which would be used in place of the springs 49 and serve to define the biasing function.

The outer seal assembly 18 is of similar construction in that it includes a rotating seal ring (a rotor) 51 and a stationary seal ring (a stator) 52 which respectively have flat annular seal faces 53 and 54 maintained in relatively rotatable sliding contact with one another to maintain a seal between the regions disposed radially inwardly and outwardly thereof. The rotor 51 externally surrounds and is sealingly engaged relative to the shaft sleeve 19 by a collar 56 which surrounds and is sealingly engaged with the rotor 51 through an elastomeric seal ring 55 disposed therebetween.

The collar 56 is fixedly secured to the shaft sleeve 19 and has one or more circumferentially-spaced drive pins 57 fixed thereto like pins 38. These pins 57 in turn project into recesses 58 formed in the rotor 51 like recesses 39 to nonrotatably couple the rotor 51 to the shaft 11.

The stator 52 is stationarily positioned within an annular recess 62 defined within the gland ring 24, with an elastomeric seal ring 63 coacting therebetween for creating a sealed relationship. A plurality of pins 65 (like pins 38) are secured to the gland ring 24 and project axially therefrom into recesses 66 (like recesses 39) formed in the back face of the stator 52 for nonrotatably securing the stator 52 relative to the gland ring 24.

The gland 23 has an opening 71 formed radially therethrough for communication with an annular chamber 72 which is defined interiorly of the gland in surrounding relationship to at least a part of the dual seal arrangement 10. This annular chamber 72, which is the buffer gas chamber as explained below, surrounds the outer seal assembly 18 and also includes an annular chamber portion 73 which is internally of the stator 32 associated with the inner seal assembly 17.

To supply a pressurized gas such as air or nitrogen to the chamber 72, the inlet opening 71 is normally coupled to a supply line in a conventional manner, the inlet of which is coupled to a conventional source of an inert pressurized buffer gas. In operation, the inert pressurized gas is supplied through inlet 71 into the annular chamber 72. The buffer gas also occupies the annular subchamber 73 and may be a gas or liquid that can be pressurized or unpressurized.

During operation of the seal arrangement, the rotors 31 and 51 rotate in unison with the shaft 11, wherein their respective seal faces 33 and 53 contact the opposing seal faces 34 and 54 to each respectively define a sealing interface which resists migration of fluid across the sealing interface. Primarily, the inboard seal ring assembly 17 works to seal against leakage of process fluid from the stuffing box chamber 16 to the buffer fluid chamber 73.

Due to the contact between the opposed seal faces, the seal rings are conventionally formed of different materials. In the illustrated embodiment, the two stators 32 and 52 are formed of carbon or other comparable seal ring material. The rotors 31 and 51, however, are normally constructed of a disparate harder material and preferably silicon carbide although other ceramic or cermet materials may be used such as tungsten carbide, silicon nitride, aluminum oxide or a metallic material such as stainless steel. The shaft sleeve 19 and gland rings 24 and 25 in which the seal rings 31, 32, 51, 52 are seated are themselves formed of Type 316 stainless steel or other comparable metal.

Generally, mechanical seals generate significant heat loads at the sealing interface, such as between the flat rotating seal face 33 or 53 and the opposing flat stationary seal face 34 and 54. These heat loads result from the high speed rotation of the shaft 11 which causes relative motion between the components, wherein such heat generation specifically is due to contact friction between the faces 33/34 or 53/54 and viscous shear of the lubricating fluid which migrates radially between the faces 33/34 or 53/54. The temperature at the seal faces 33/34 or 53/54 varies directly with the heat generation, and varies inversely with the convection and conduction coefficients which help dissipate heat through the seal components, internal chambers and the fluid contained therein. However, in fluids that act as poor lubricants and as poor convective media such as air, nitrogen or other gases, heat would build up to a greater degree.

Further, the heat generation greatly increases during upset conditions such as dry running conditions where the process fluid is lost from the stuffing box 16 which thereby results in a loss of lubricating process fluid between the opposed seal faces 33/34 or 53/54 and substantially great heat generation. In dry running conditions, the continuing contact between the seal faces can lead to excessively high seal face temperatures wherein the excessive temperature can rapidly lead to seal failure.

To greatly improve the capability of the seal arrangement 10 to withstand heat buildup from the cooperation of the opposed seal faces 33/34 or 53/54, the seal 10 of the invention further includes heat transfer sheets 90 and 91 intermediately between the rotors 31 and 51 and the opposing surfaces of the collars 35 or 56 in which same are seated. Since the rotors or seal rings 31 and 51 seated in the collars 35 and 56 are structurally and functionally similar, the discussion of FIGS. 2-6 is directed to the rotor 31 and associated collar 35 with the following discussion also being applicable to seal ring 51 and associated collar 56.

Referring to FIGS. 2-6, the rotor 31 has the hub portion 37 which defines a rear ring face 92 which faces in an axial direction opposite to the seal face 33. The ring face 92 extends circumferentially and is continuously smooth except at the locations in which the drive pin notches 39 are formed. As such, the rear ring face 92 is formed of arcuate face segments 93 disposed on opposite sides of each notch 39.

As to the collar 35, this collar 35 defines an axially opening pocket 95 (FIGS. 5 and 6) which receives the rotor hub portion 37 therein. The pocket 94 includes a collar face 96 which faces toward the rear ring face 92 so as to be substantially parallel to each other in facing relation. The collar face 96 also includes bores 97 which receive the drive pins 38 therein as seen in FIG. 5, which pins 38 project into the seal ring notches 39.

Figure 2:
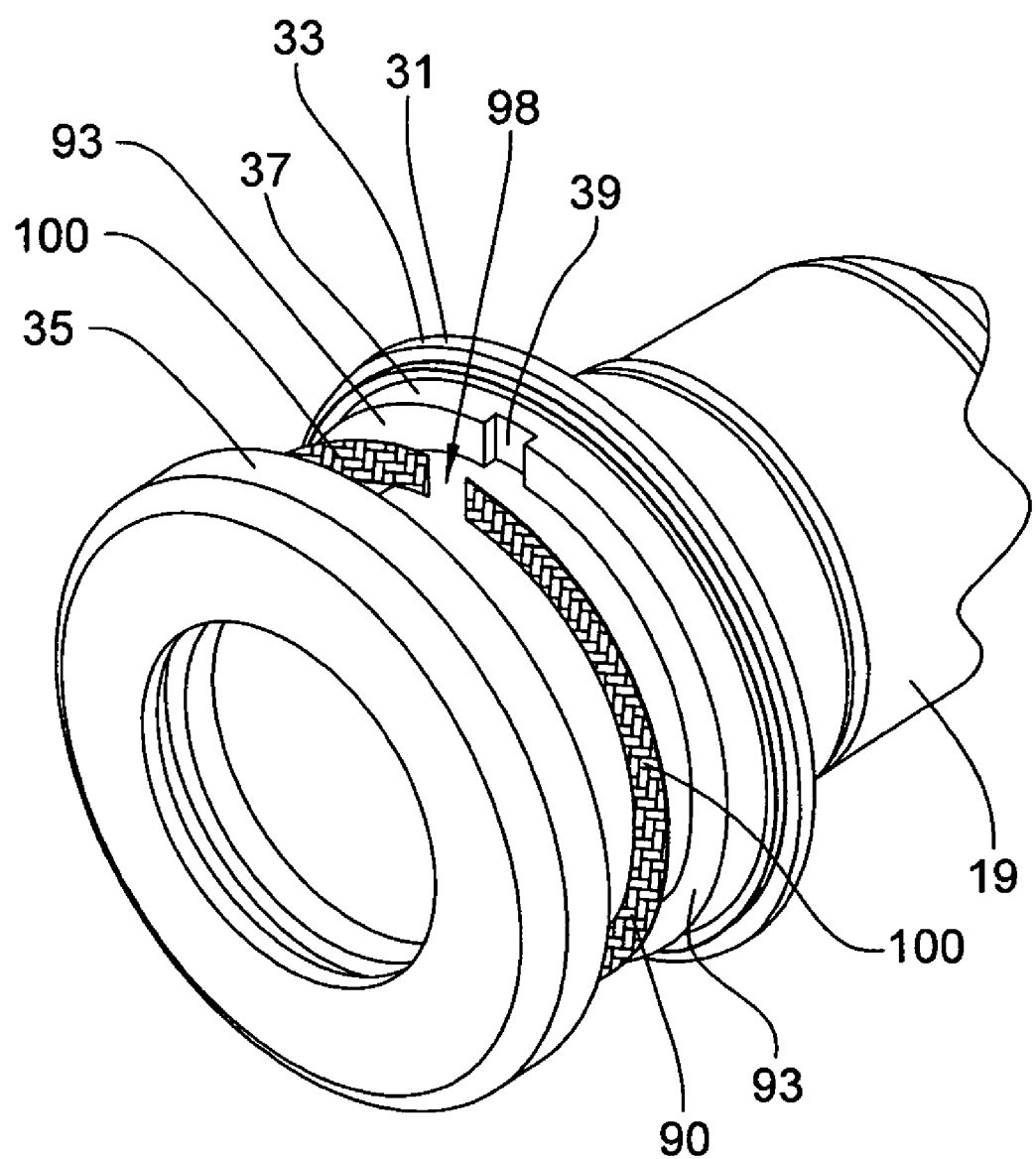
FIG. 2 is a perspective view of a shaft sleeve and a seal ring with a heat transfer sheet material positioned to be sandwiched between the seal ring and shaft sleeve.
Figure 3:
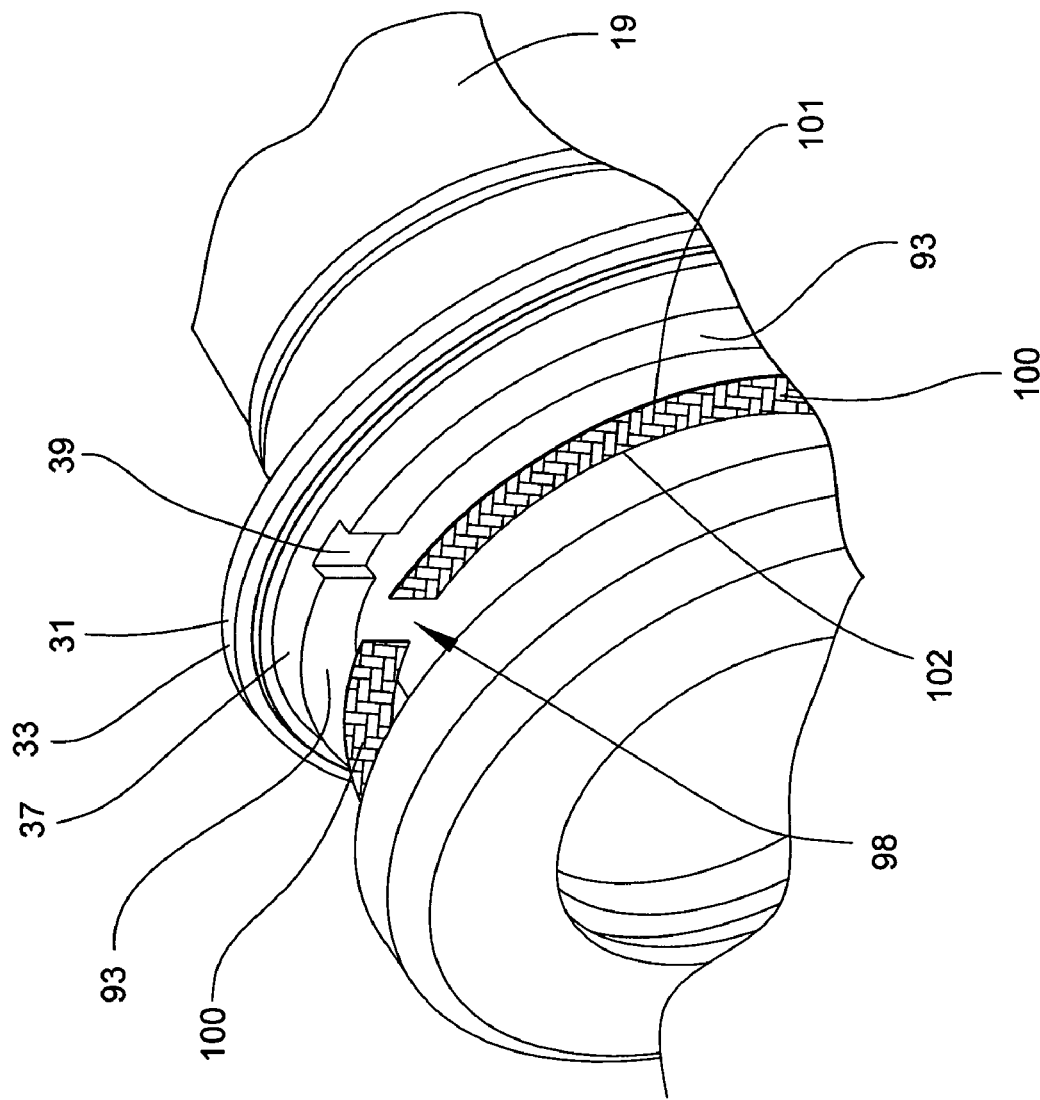
FIG. 3 is an enlarged perspective view of the assembly of FIG. 2.
Figure 4:
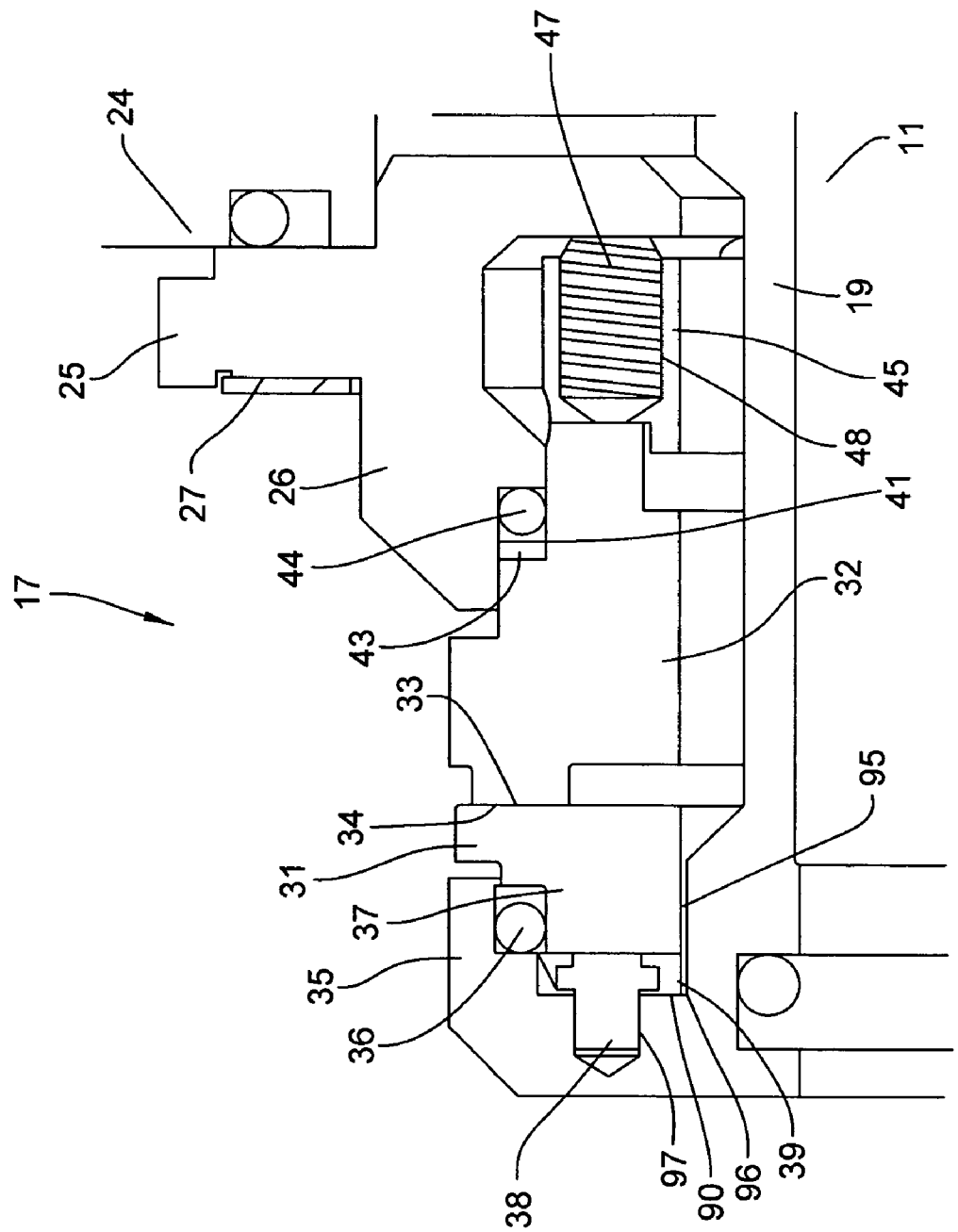
FIG. 4 is an enlarged view of a pair of seal rings and the shaft sleeve.

Additionally the heat transfer sheet 90 is provided as seen in FIGS. 2, 3 and 6, which sheet 90 has a circumferentially extending, substantially annular flat shape. The sheet 90 eventually includes a gap 98 for each of the drive pins 38 and notches 39. Where multiple notches 39 and pins 38 are provided, the sheet 90 in use would comprise a plurality of separate, arcuate sheet sections 100 which overlie and map on the arcuate face segments 92 of the rotor 31. The sheet 90 is thin in the axial direction and wide in the transverse radial direction and defines opposite sheet faces 101 and 102 which are sandwiched in compression between and respectively contact the seal ring face 93 and the collar face 96 as seen in FIG. 6. Preferably, the graphite sheet has a thickness of 0.005 inches to 0.030 inches. As such there is continuous surface contact over the entire surface areas of the sheet faces 101, 102, the seal ring face 93 and the collar face 96.

During installation, the sheet 90 preferably is glued or adhered to the seal ring face 93, wherein the sheet 90 is preferably formed as a continuous, one-piece annular ring, and once adhered in place, the sections of the sheet 90 overlying or bridging the ring notches 39 are manually cutout to define the gaps 98. The adhesive is sufficiently thin and of a suitable composition so as to permit the efficient transfer of heat from the rotor 31 to the sheet 90. The sheet 90 is sufficiently thin so as to be flexible and thereby essentially conform to the flatness of ring face 93 continuously over the surface area thereof.

When the rotor 31 seats in the collar 35, the sheet 90 also has its sheet surface 90 pressed tightly against the opposing collar face 96 so as to essentially conform to the flatness of collar face 96 continuously over the surface area thereof and permit the transfer of heat from the sheet 90 to the collar 35.

In view of the foregoing, the invention relates to a method for enhancing heat removal from the mechanical seal faces 33/34 and 53/54 which results in a significant increase in the ability of the seal 10 to tolerate poor lubrication conditions such as dry running where heat loads are increased and convection cooling is poor.

In this regard, the sheets 90 and 91 are located in the seal 10 adjacent to a thermally conductive seal ring, namely the rotors, 31 or 51 of each opposed pair of seal rings. The other seal rings, namely the stators 32 and 52 are carbon and have significantly lower thermal conductivity as compared to the rotors 31 and 51. As previously noted, the collars 35 and 56 are formed of a metal which itself is thermally conductive and is not insulative. By positioning the intermediate heat transfer sheets 90 and 91 sandwiched between the thermally conductive seal rings 31 and 51 and the respective thermally conductive collars 35 and 56, the heat building up at the seal faces flows away therefrom through heat dissipating flow paths that extend from the seal faces, toward the sheets 90 and 91 and then through the sheets 90 and 91 to the collars 35 and 36 which are best able to dissipate the heat. The sheets 90 and 91 in combination with the associated seal rings and support surfaces define flow paths having a total conductivity corresponding to the individual thermal conductivities of the sheets, seal rings and support surfaces as well as the overall conductivity defined at the interfaces between these components. In the other seal ring, however, the total thermal conductivity is substantially lower due to the seal ring material and any structures existing between the seal ring and its support surface such as the springs above and any spaces associated therewith.

Hence, the mechanical seal 10 of the invention employs the following features: (1) A thin, flat sheet of flexible thermally conductive graphite material placed between one of the mechanical seal ring faces, such as face 93, and a metal surface such as the metal surface 96 defined by the collar 35 of the shaft sleeve 19. It also is possible that the seal rings might be reversed such that the thermally conductive seal rings are the stators 32 and 52 which are supported on the gland rings 24, 25 so that the gland 23 serves as the seal ring holder. In such case the sheets 90 and 91 would be sandwiched between the seal rings 32 and 52 and the gland 23. (2) The graphite sheet 90, 91 is located axially between the more thermally conductive mechanical seal face 31 and 51 and the metal face holder part. The conductive seal face material preferably is a ceramic or cermet material such as silicon carbide, tungsten carbide, silicon nitride, aluminum oxide, or a metallic material such as stainless steel. (3) Fluid pressure and spring forces are used to create a compressive load between the seal face like face 93, graphite flat intermediate sheet 90, and metal part like collar 35 to maximize continuous contact between the opposed faces of these parts and the opposite sides of the graphite sheet. (4) The graphite sheet has a thickness of 0.005 inches to 0.030 inches so that the sheet can compress and conform to both of the faces between which it is sandwiched and can readily transfer heat through the sheet material.

More particularly, the invention is based on a thin sheet of un-reinforced graphite sheet material that is sandwiched between a silicon carbide, tungsten carbide, silicon nitride, or aluminum oxide seal face material and a metal component of the seal such as the sleeve or gland. The sheet is housed or sandwiched axially between the surface of the seal face, which is located opposite of the primary sealing interface defined between opposed seal faces, and the surface of either a rotating or stationary metal component such as a sleeve, gland, or rotating face support.

The sheet material is used to enhance the conduction of heat from the seal face into the metal component, thereby reducing the seal face temperature and improving seal performance, especially in poor lubrication conditions such as dry running.

In dry run tests conducted on a prototype mechanical seal design using a conventional direct metal conduction path from the mechanical seal face to a metal seal ring holder, the seal face temperature would excessive levels in under 10 minutes of dry running that were sufficient to damage the seal ring components. This temperature would degrade the seal face materials and elastomers in contact with the seal faces, rapidly resulting in seal failure. When the invention was tested with the graphite sheet provided between the seal face and the metal sleeve, seal face temperatures did not reach damaging levels in one hour of dry running or at least several times longer than seals which were not constructed according to the invention.

The graphite sheet material comprises a commercially available industrial grade flexible graphite flat sheet material, and has been shown to be effective in thicknesses from 0.005" to 0.030" in testing. The key features of the sheet that enable conduction are: (1) the ability of the material to conform to the surface variations of both the seal face and metal part, increasing the contact between the parts and therefore the conductivity; (2) high thermal conductivity in the transverse plane of the sheet, which enables improved conduction in any areas where the sheet does not fully conform; and (3) high thermal conductivity in the axial plane of the sheet, which enables heat flow.

Preferably, the thermal conductivity of the components is as follows: (1) intermediate sheet material between the sleeve or gland and thermally conductive seal face has an overall conductivity of between 5 and 250 W/M*K (2.9 to 144.5 Btu/hr*ft*F); (2) intermediate sheet material has higher conductivity along the plane of the sheet of 100 to 250 W/M*K (57.8 to 144.5 Btu/hr*ft*F) and can have a lower conductivity normal to the sheet plane while still being thermally conductive; and (3) seal face material is highly thermally conductive, with a conductivity greater than 30 W/M*K (17.4 Btu/hr*ft*F).

These thermal conductivities and the structural cooperation between the thermally conductive seal ring, the intermediate heat transfer sheet and the seal ring holder thereby define a flow path away from and out of the heat generating seal faces and towards the seal ring holder which serves to thereby dissipate the heat buildup. Generally then, the seal rings are formed of disparate seal ring materials having disparate thermal conductivities wherein a thermally conductive one of said seal rings is thermally conductive and has a greater thermal conductivity than the other of the seal rings. The thermally conductive seal ring has a thin thermally conductive intermediate sheet fitted between the thermally conductive seal ring and its respective support surface, with the respective support surface in turn being defined by a thermally conductive material. As such, a heat dissipating flow path extends from the thermally conductive seal ring, through the intermediate sheet, and to the respective support surface which is thermally conductive wherein heat buildup between the seal ring surfaces during shaft rotation is drawn from the seal ring surfaces, through the thermally conductive seal ring and the intermediate sheet to the respective support surface and is dissipated therefrom.

It is possible that the seal rings even might not be formed of disparate materials or alternatively, might have thermal conductivities which differ but are still similar, and in such instance, one of the seal rings is structured or has an intermediate material between the seal ring and its support surface which interrupts the heat flow path between this one seal ring and its supporting structure such as a gland or sleeve. For example, a spring loaded seal ring would have gaps between the seal ring and the holder defined by the gland or shaft sleeve. Hence, in such instance, even though the seal rings might have the same or similar thermal conductivity values, the total thermal conductivity of the heat flow paths from the two seal rings might differ substantially or be disparate such that the one thermally conductive seal ring has a thermally conductive flow path due to the intermediate sheet in contact therewith, and the other seal ring has a heat flow path which is in fact insulative or has a low thermal conductivity such that heat would be drawn away from the seal ring faces by the one seal ring and its intermediate sheet.

Although a particular preferred embodiment of the invention has been disclosed in detail for illustrative purposes, it will be recognized that variations or modifications of the disclosed apparatus, including the rearrangement of parts, lie within the scope of the present invention. For example, it will be understood that while a dual seal configuration is shown, a single seal configuration also may be provided.

What is claimed is:

1. A mechanical seal for sealing a fluid in a space between an equipment housing and a rotatable equipment shaft, comprising:
    a shaft sleeve mountable on the rotatable shaft so as to be rotatable in unison with the shaft about a shaft axis, said shaft sleeve having a respective support surface oriented transverse to the shaft axis so as to face axially;
    a seal gland mountable to the equipment housing so as to define an annular chamber defined radially between said shaft sleeve and said gland, said gland having a respective support surface oriented transverse to the shaft axis in axially spaced opposing relation with said support surface of said shaft sleeve;
    a first seal ring mounted on said shaft sleeve for rotation therewith and having a planar front sealing surface and a back ring surface respectively facing said support surface of said shaft sleeve;
    a second seal ring non-rotatably mounted on said gland which is substantially coaxial with said first seal ring and has a back ring surface respectively facing said support surface of said gland, said second seal ring having a planar front sealing surface disposed in facing, sealing relation with said front sealing surface of said first seal ring to sealingly separate first and second regions of said annular chamber during relative rotation of said first and second seal rings during shaft rotation;
    said first and second seal rings being formed of disparate seal ring materials having disparate thermal conductivities wherein a thermally conductive one of said first and second seal rings is thermally conductive and has a greater thermal conductivity than the other of said first and second seal rings, said thermally conductive seal ring having a thin thermally conductive intermediate sheet fitted between said thermally conductive seal ring and its respective support surface, said respective support surface being defined by a thermally conductive material wherein a heat dissipating flow path from said thermally conductive seal ring, through said intermediate sheet, and to said respective support surface is thermally conductive such that heat buildup between said front sealing surfaces during shaft rotation is drawn from said front sealing surfaces, through said thermally conductive seal ring and said intermediate sheet to said respective support surface and is dissipated therefrom.

2. The mechanical seal according to claim 1, wherein said heat flow path has a greater thermal conductivity than a thermal conductivity between the other said seal ring and its respective support surface.

3. The mechanical seal according to claim 2, wherein the other said seal ring is formed of a carbon material.

4. The mechanical seal according to claim 3, wherein said intermediate sheet is formed of thermally conductive graphite and is compressed in substantially continuous facing contact between said back ring face and said respective support surface.

5. The mechanical seal according to claim 1, further including biasing means for axially biasing one of said first and second seal rings towards the other of said first and second seal rings wherein said intermediate sheet is disposed in compression between said back ring face and said respective support surface.

6. The mechanical seal according to claim 1, wherein said intermediate sheet is formed of thermally conductive graphite and is compressed in substantially continuous facing contact between said back ring face and said respective support surface.

7. The mechanical seal according to claim 1, wherein said intermediate sheet is formed of thermally conductive graphite having an overall thermal conductivity of between 5 and 250 W/M*K.

8. The mechanical seal according to claim 7, wherein said intermediate sheet has an overall thermal conductivity of between 5 and 250 W/M*K, and said seal face material is highly thermally conductive with a conductivity greater than 30 W/M*K.

9. The mechanical seal according to claim 8, wherein said respective support surface is formed of a thermally conductive metal.

10. The mechanical seal according to claim 7, wherein the thermal conductivity through said other seal ring and its respective support surface is lower than the thermal conductivity through said heat dissipating flow path.

11. The mechanical seal according to claim 10, wherein said thermal conductivity of said other seal ring is lower than said thermal conductivity of said thermally conductive seal ring.

12. The mechanical seal according to claim 1, wherein said thermally conductive seal ring is said first seal ring.

13. The mechanical seal according to claim 1, wherein said thermally conductive seal ring is said second seal ring.

14. The mechanical seal according to claim 1, wherein said intermediate sheet is formed of thermally conductive graphite having an overall thermal conductivity of between 5 and 250 W/M*K with a higher conductivity along a transverse plane of the sheet of 100 to 250 W/M*K and a lower conductivity normal to the sheet plane while still being thermally conductive, and said seal face material further being highly thermally conductive with a conductivity greater than 30 W/M*K.

15. The mechanical seal according to claim 1, wherein said back face of said thermally conductive seal ring has drive notches separating circumferential segments of said back face, said intermediate sheet covering said circumferential segments and having gaps in the area of said notches to permit drive pins to extend axially from said respective support surface to said drive notches.

16. A mechanical seal for sealing a fluid in a space between an equipment housing and a rotatable equipment shaft, comprising:
- a shaft sleeve mountable on the rotatable shaft so as to be rotatable in unison with the shaft about a shaft axis, said shaft sleeve having a respective support surface oriented transverse to the shaft axis so as to face axially;
- a seal gland mountable to the equipment housing so as to define an annular chamber defined radially between said shaft sleeve and said gland, said gland having a respective support surface oriented transverse to the shaft axis in axially spaced opposing relation with said support surface of said shaft sleeve;
- a first seal ring mounted on said shaft sleeve for rotation therewith and having a planar front sealing surface and a back ring surface respectively facing said support surface of said shaft sleeve;
- a second seal ring non-rotatably mounted on said gland which is substantially coaxial with said first seal ring and has a back ring surface respectively facing said support surface of said gland, said second seal ring having a planar front sealing surface disposed in facing, sealing relation with said front sealing surface of said first seal ring to sealingly separate first and second regions of said annular chamber during relative rotation of said first and second seal rings during shaft rotation;
- said first and second seal rings being formed of respective seal ring materials having respective thermal conductivities wherein a thermally conductive one of said first and second seal rings is a total thermally conductivity between said one seal ring and its support surface which is greater the total thermal conductivity defined between the other of said first and second seal rings and its support surface, said one seal ring having a thin thermally conductive intermediate sheet fitted between said one seal ring and its respective support surface, said respective support surface being defined by a thermally conductive material wherein a heat dissipating flow path from said thermally conductive seal ring, through said intermediate sheet, and to said respective support surface defines a total thermal conductivity which is thermally conductive such that heat buildup between said front sealing surfaces during shaft rotation is drawn from said front sealing surfaces through said one seal ring away from the other said seal ring, and through said intermediate sheet to said respective support surface and is dissipated therefrom.

17. The mechanical seal according to claim 16, further including biasing means for axially biasing said other of said first and second seal rings towards the one said first and second seal rings.

18. The mechanical seal according to claim 16, wherein said thermal conductivity of said other seal ring is lower than said thermal conductivity of said thermally conductive seal ring.

* * * * *